United States Patent

Aoyama et al.

[11] Patent Number: 5,990,638
[45] Date of Patent: Nov. 23, 1999

[54] SYNCHRONIZING METHOD FOR COMMUNICATION

[75] Inventors: Kazunari Aoyama; Yoshiyuki Kubo, both of Oshino-mura, Japan

[73] Assignee: Fanuc, Ltd., Yamanashi, Japan

[21] Appl. No.: 09/011,919

[22] PCT Filed: Jun. 23, 1997

[86] PCT No.: PCT/JP97/02151

§ 371 Date: Feb. 23, 1998

§ 102(e) Date: Feb. 23, 1998

[87] PCT Pub. No.: WO97/49013

PCT Pub. Date: Dec. 24, 1997

[30] Foreign Application Priority Data

Jun. 21, 1996 [JP] Japan .................................. 8-179777

[51] Int. Cl.⁶ ........................... H02P 5/52; G05B 19/18
[52] U.S. Cl. ........................... 318/85; 318/562; 318/567; 364/474.11; 364/474.01
[58] Field of Search ........................ 318/34–85, 560–696; 364/474.01–474.18

[56] References Cited

U.S. PATENT DOCUMENTS

| 4,218,705 | 8/1980 | Inaba et al. .............................. 358/149 |
| 4,703,431 | 10/1987 | Sako et al. ............................... 318/625 |
| 5,390,351 | 2/1995 | Di Giulio et al. ....................... 395/725 |

FOREIGN PATENT DOCUMENTS

| 63-039496 | 2/1988 | Japan . |
| 4-135210 | 5/1992 | Japan . |
| 4-143804 | 5/1992 | Japan . |

*Primary Examiner*—Paul Ip
*Attorney, Agent, or Firm*—Staas & Halsey

[57] ABSTRACT

A CNC device 10 and servoamplifiers SA1, SA2 are connected in the manner of a daisy-chain. The positions of the servo motors M1, M2 detected by pulse coders P1, P2 are read in synchronization at the same point in time. In such circumstances, the synchronizing signal for the command to read the positions is propagated from the CNC device 10 to the servoamplifiers SA1, SA2 by means of transmission lines L1, L2. Propagation delay is generated, but synchronization is achieved by correcting this propagation delay time, so that the positions of the servo motors M1, M2 are detected at the same point in time.

10 Claims, 8 Drawing Sheets

SIGNAL WITHIN CNC DEVICE 10

SIGNAL S1 FOR STARTING
CALCULATION OF COMMAND VOLTAGE

COMMAND VOLTAGE CALCULATED

SIGNAL S2 FOR STARTING
TRANSMISSION OF COMMAND VOLTAGE

COMMAND VOLTAGE PACKET

SIGNAL WITHIN SERVOAMPLIFIER SA1

COMMAND VOLTAGE PACKET

HEADER DETECTION SIGNAL
(SYNCHRONIZED SIGNAL) S3

LATCH AND TRANSMISSION
TIMING SIGNAL S4

TIMER COUNT VALUE OF SA1

SIGNAL WITHIN SERVOAMPLIFIER SA2

COMMAND VOLTAGE PACKET

HEADER DETECTION SIGNAL
(SYNCHRONIZED SIGNAL) S3

LATCH AND TRANSMISSION
TIMING SIGNAL S4

TIMER COUNT VALUE OF SA2

DIRECTION OF TRANSMISSION

FIG. 6

DIRECTION OF TRANSMISSION

SYNCHRONIZING METHOD FOR COMMUNICATION

This application is a 371 of PCT/JP97/02151 filed Jun. 23, 1997.

TECHNICAL FIELD

The present invention relates to a method of synchronization in communication between devices in the field of numerical control devices, robot-controllers and their peripheral devices and similar industrial devices where it is vital that they operate in synchronization.

BACKGROUND ART

In a system consisting of a numerical control device (hereinafter referred to as CNC device), a robot-controller and its peripheral devices or similar industrial device, it is sometimes necessary to link a plurality of devices by means of serial communication for the purpose of ensuring that they operate in synchronization with one another. For instance, machine-tools which are driven and controlled by CNC devices must be synchronized in order to detect the current position of the individual feed shafts at the same point in time. Similarly, the individual shafts have to be moved in synchronization. Signals for the purpose of implementing synchronization of this sort are transmitted by way of serial communication.

Figure 13:
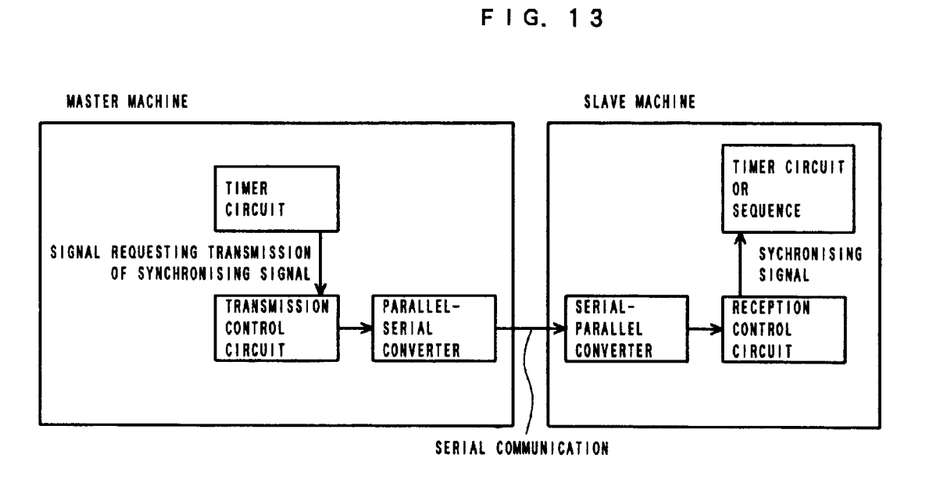
FIG. 13 is a diagram for the purpose of explaining a conventional system wherein two machines (master and slave) are connected by means of communication.

For instance, FIG. 13 illustrates a system where two machines (master and slave) are connected by communication. One method of controlling the slave machine by synchronizing it with the aid of serial communication to the master machine involves emitting from the master machine to the slave machine a signal requesting transmission of a synchronizing signal with a predetermined cycle from a timer at a time which is to form the basis for synchronization, transmitting a packet (frame) on a transmission control circuit identifying it as a synchronizing signal, and transmitting this packet after conversion to a serial signal by means of a parallel-serial converter. Each time the reception control circuit of the slave machine receives this packet by way of a serial-parallel converter, it either operates its own internal sequencer or controls its own internal timer in such a manner as to make it conform to the timer of the master machine. This method is well known.

Figure 14:
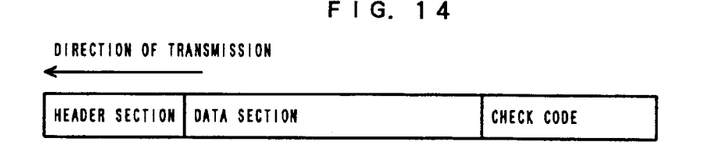
FIG. 14 is an explanatory diagram of the packet used for communication in the system illustrated in FIG. 13.

The packet which is transmitted from the master machine for the purpose of synchronization may be for exclusive use. Provided that a request for the transmission of data from the master machine is generated with synchronous timing, this data packet itself is sometimes treated as synchronization information. FIG. 14 illustrates an example of this packet. The slave machine may treat reception of either the whole packet or just the header section of the packet as a synchronization information.

When a packet is transmitted by serial communication, there is a discrepancy equivalent at least to the length of the serial data between the timing with which the transmitting side begins transmitting and that with which the receiving side finishes receiving the data.

Figure 15:
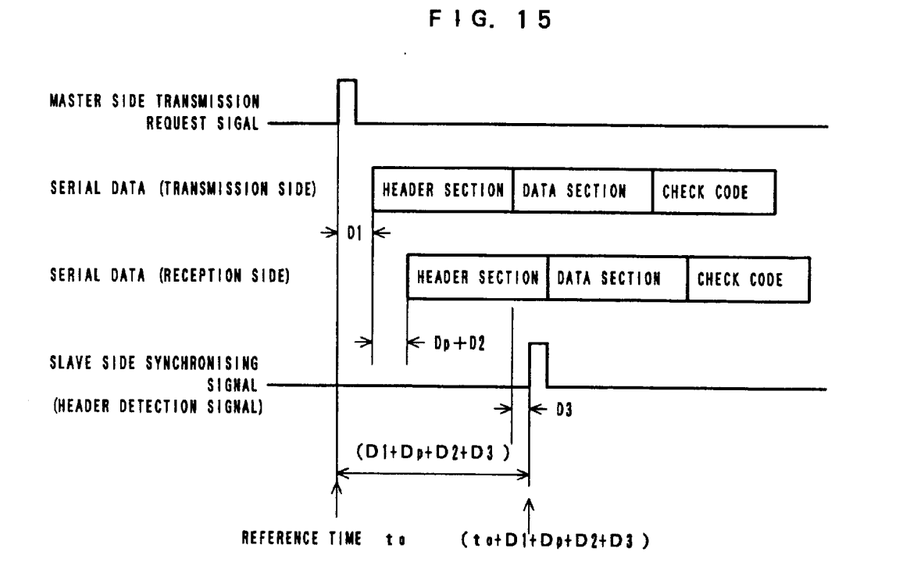
FIG. 15 is a diagram for the purpose of explaining deviations in synchronization in the system illustrated in FIG. 13.

FIG. 15 is a diagram which elucidates this discrepancy in timing for the example shown in FIG. 13. In FIG. 15 only the header section is treated as synchronization data (synchronizing signal). It is assumed that a request for transmission is generated cyclically in accordance with an internal timer in the master machine, and that now at a given time (reference time t0) such a request for transmission has been generated from the timer of the master machine. The transmission control circuit transmits a packet of the type illustrated in FIG. 14 to the parallel-serial converter, where it is converted into a serial signal and transmitted to the slave machine. There is a delay D1 from the time at which this signal requesting transmission was generated until the packet is transmitted to the transmission line. The reception of this packet by the slave machine entails further delays in the forms of the propagation time on the transmission line Dp and the time D2 required for synchronization. Inasmuch as the slave machine becomes aware of the arrival of the header section only after a fixed interval D3 from the completion of its reception, the synchronizing signal (header detection signal) generated by the slave machine is subject to a delay equivalent to the total of the delays (D1+Dp+D2+D3) from the time t0 at which the request for transmission was generated by the master machine.

Conventionally, the propagation delay time Dp during which the signal propagates along the transmission line has been regarded as capable of being ignored. The remaining delay times D1, D2 and D3 are always constant and can be determined without difficulty from the circuitry configuration which was adopted at the time of designing the master and slave machines. Thus, when synchronizing in the conventional manner by the internal timer in the slave machine, the delay (D1+D2+D3) determined from the circuitry configuration is previously set in the slave machine as a correction value. When the slave machine detects the synchronizing signal (header detection signal), it sets the correction value as the initial value in the internal timer to activate the timer. The timer takes 'time up' (the time when the internal timer in the master machine has measured the value obtained by subtracting the correction value from the time beginning with the reference time t0 and ending with synchronization time T) as the synchronization time, thereby accomplishing desired synchronization by making correction corresponding to the delay. The opposite method is also used, whereby the delay is corrected by advancing the timing with which transmission begins from the master machine by the known amount of the delay and controlling the internal timer in the slave machine, by regarding the time at which the synchronizing signal (header detection signal) is detected as reference time.

The higher the communication rate (bit rate), the more accurate synchronization control of serial communication becomes. For example, an accuracy of approximately 1 ms at 1 Mbps rises to about 10 ns at 100 Mbps. At such a degree of accuracy it is no longer possible to overlook the time Dp which is required in order for the signal to propagate the serial communication. The time it takes for the signal to propagate along the transmission line is roughly 5 ns/m in the case of optical fibres, so that a delay of 50 ns is generated in propagating 10 m.

Nor is it possible to overlook the propagation delay even where the communication rate (bit rate) is slow if the transmission line is long.

SUMMARY OF THE INVENTION

It is an object of the present invention to provide a method of synchronization which will allow this to be implemented between machines with a high degree of accuracy even where there is increased propagation delay on the transmission line.

With a view to achieving this object, the present invention is a method of synchronizing a plurality of machines connected by serial communication and operating in synchronization, wherein the propagation delay time required for the synchronization signal to be propagated from the transmitting side to the receiving side is programmed as a correction value into the machine on either the transmitting or receiving side, so that the plurality of machines can be synchronized by correcting the synchronizing signal on the basis of the correction value.

In this manner, the present invention allows synchronization to be achieved and controlled accurately, where a plurality of machines is connected by a communication transmission line so as to operate in synchronization, by taking into account the propagation delay time in the transmission line.

BEST MODE FOR CARRYING OUT THE INVENTION

There follows, with the aid of FIGS. 1–6, a description of a first embodiment, in which the present invention is applied to a CNC device for controlling machine-tools and similar equipment.

First of all, the servo system in the CNC device will be explained in outline with reference to FIG. 1.

A CNC device 10 (master machine) is connected in the manner of a daisy-chain to servoamplifiers SA1, SA2 of servo motors M1, M2 (slave machines). In other words, the CNC device 10 and the servoamplifier SA1 of the first servo motor M1 are connected by means of a transmission line L1, while the servoamplifier SA1 of the first servo motor M1 and the servoamplifier SA2 of the first servo motor M2 are connected by a transmission line L2. It should be added that the example cited in this embodiment has two servo motors, but if the number of shafts is increased as the result of increase in the number of servo motors, the servoamplifier corresponding to the servo motors can be connected by means of transmission lines in the same manner.

A command voltage (current) is fed from each of the servoamplifiers SA1, SA2 to their respective servo motors M1, M2, and feedback signals Pf1, Pf2 indicating the positions of the servo motors M1, M2 are returned to the servoamplifiers SA1, SA2 from pulse coders P1, P2 with which the servo motors M1, M2 are provided.

Next, the principal section of the CNC device 10 will be described using the block diagram in FIG. 2.

The CNC device 10 has a processor 101, while a ROM 102 in which the system program is stored, a RAM (comprising in part a non-volatile RAM) 103 in which the NC program and various other data are stored and which is used for processing and other purposes, a transmission control circuit 104 and a reception control circuit 105 are connected by buses. A timer circuit 108 outputs with a predetermined cycle to the processor 101 a signal S1 for calculation of the command voltage to begin, and after allowing ample time for the processor 101 to finish calculating the command voltage, outputs with the same predetermined cycle to the transmission control circuit 104 a signal S2 for starting transmission of the command voltage to the servoamplifiers SA1, SA2. There is also connected to the transmission control circuit 104 a parallel-serial converter 106 whereby parallel signals are converted into serial signals, transmission data which has been converted in this manner being sent to the transmission line L1. Reception data input by way of the transmission line L1 is input into a serial-parallel converter 107, where serial signals are converted into parallel, and this serial-parallel converter 107 is connected to the reception control circuit 105.

The principal section of the servoamplifier SA1 will be explained using the block diagram in FIG. 3. Data sent from the CNC device 10 by way of the transmission line L1 is input into a serial-parallel converter 201 and into a buffer circuit 203. This buffer circuit 203 is connected to the transmission line L2, and data received from the CNC device 10 is transmitted on to the next servoamplifier SA2. A reception control circuit 202 is connected to the serial-parallel converter 201, and data which has been converted into a parallel signal is input into this reception control circuit 202. To this reception control circuit 202 is also connected a digital-analogue converter 204, data output by the reception control circuit 202 being converted into an analogue signal in this digital-analogue converter 204 to become a command voltage to the servo motor M1. The reception control circuit 202 is connected to a timer circuit 206, to which a header detection signal (synchronizing signal) S3 is output in order to start this timer circuit 206. As is explained below, a value obtained by adding predetermined correction value 1 and correction value 2 in an adder 205 is programmed into the timer circuit 206 as the correction value of the synchronizing signal.

The timer circuit 206 outputs a latch and transmission timing signal S4 to a data latcher 210 and a transmission control circuit 211, and the value of reversible counter 207 which counts feedback pulses from the pulse coder P1 is latched in the data latcher 210. The transmission control circuit 211 outputs this latched value and transmission data from the downstream servoamplifier SA2, which is input by way of a serial-parallel converter 208 and stored in a buffer circuit 209, to a parallel-serial converter 212, where it is converted it into a parallel signal and sent to the transmission line L1, being output to the CNC device as feedback data (data indicating the positions of the servo motors M1, M2).

Figure 3:
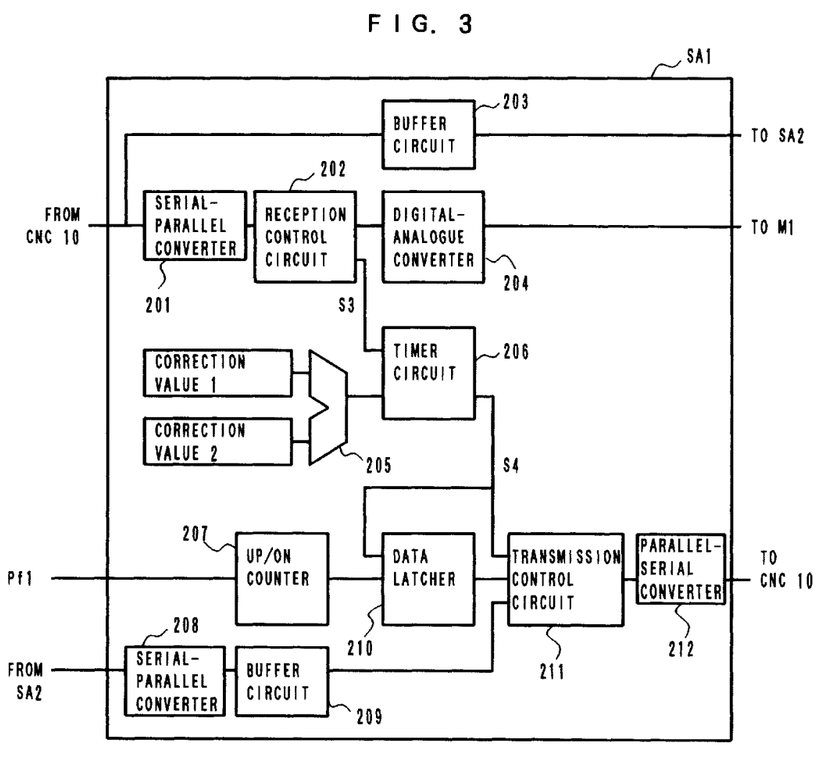
FIG. 3 is a block diagram of the principal section of the servoamplifier in the servo system illustrated in FIG. 1.

The downstream servoamplifiers are also configured in the same manner as illustrated in FIG. 3, except that where no further servoamplifiers are connected downstream from a given servoamplifier, i.e., in the case of the servoamplifier SA2 in the present embodiment, there is no real need for the buffer 203, serial-parallel converter 208 and buffer circuit 209.

Figure 1:
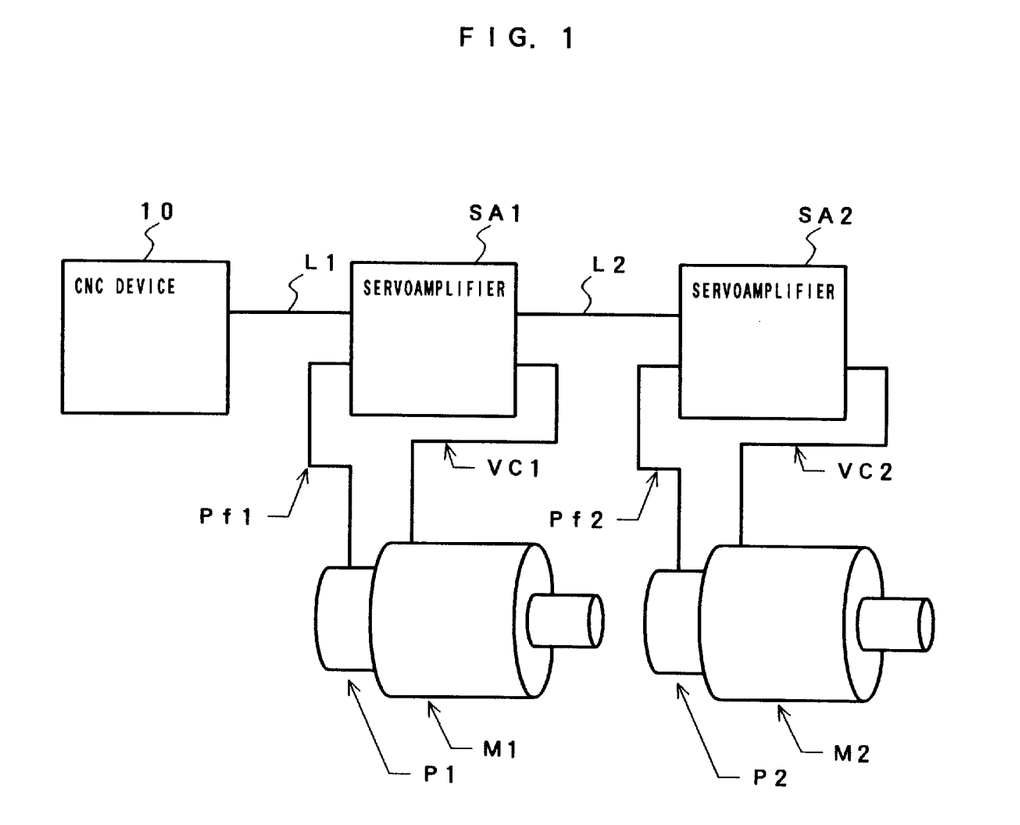
FIG. 1 is a block diagram of a servo system wherein the first embodiment of the present invention is employed.
Figure 2:
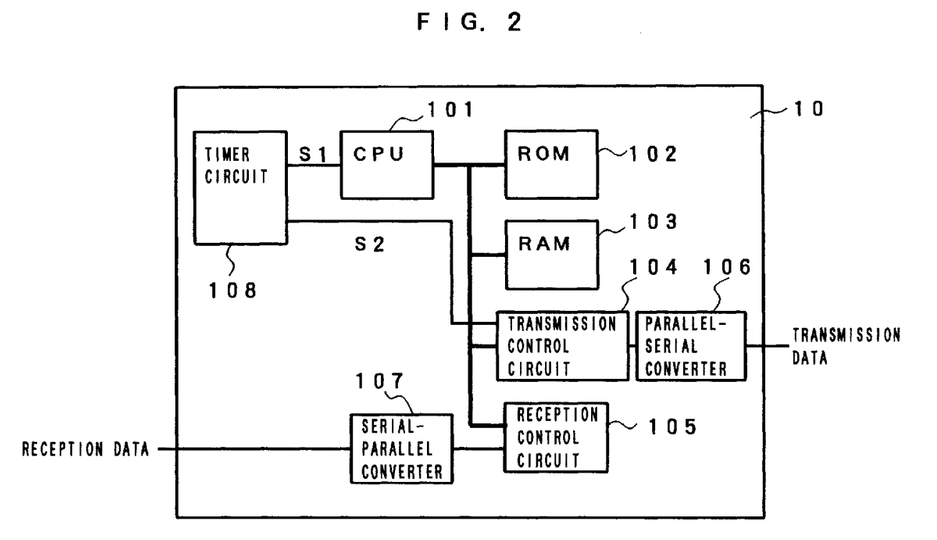
FIG. 2 is a block diagram of the principal section of the CNC device in the servo system illustrated in FIG. 1.
Figure 4:
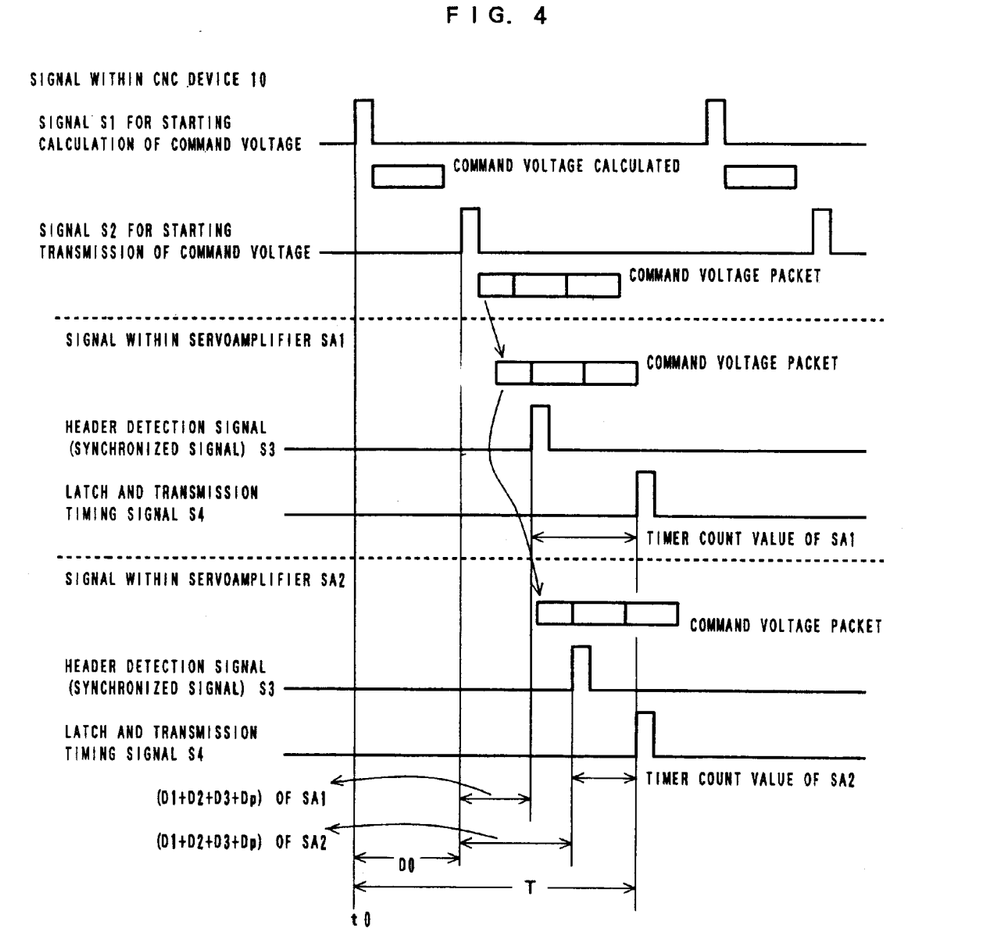
FIG. 4 is a timing chart when the first embodiment is implemented with the servo system illustrated in FIG. 1.

There follows, with reference to FIGS. 1–3 and the timing chart in FIG. 4, an explanation of the operation of synchronization in this system.

Figure 5:
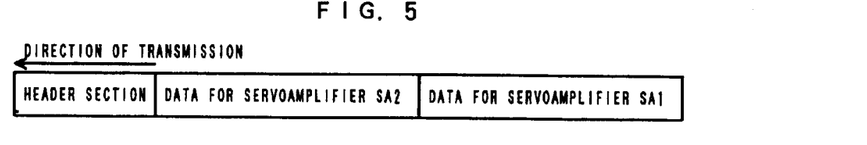
FIG. 5 is an explanatory drawing of the packet which is transmitted from the CNC device illustrated in FIG. 2 to the servoamplifier illustrated in FIG. 3.

The timer circuit 108 within the CNC device 10 outputs to the processor 101 with a predetermined cycle a signal S1 for starting calculation of the command voltage. The timing with which this signal Si for calculation of the command voltage to begin is generated is taken as the reference time t0. When the processor 101 receives the signal S1 for starting calculation of the command voltage, it reads and analyses the NC program within the RAM 103, and on the bases of movement commands already acquired and feedback data from the servoamplifiers SA1, SA2 which has been input into the reception control circuit 105 by way of the serial-parallel converter 107, processes the feedback on position and speed, calculates a new command voltage for servo motor of each shaft within the predetermined cycle, and outputs to the transmission control circuit 104. The signal S2 for transmission of the command voltage to the servoamplifiers to begin is generated, as shown in FIG. 4, from the timer circuit 108 at a predetermined delay D0 in relation to the reference time t0, and input into the transmission control circuit 104 is effected. When the transmission control circuit 104 receives the signal S2 for starting transmission of the command voltage, as FIG. 5 shows, it sends to the parallel-serial converter 106 for conversion into a serial data a packet, wherein a header which functions as a synchronizing signal is added to the data for the servoamplifiers SA1, SA2, and transmits the serial data by transmission line 1.

When the servoamplifier SA1 receives this packet, it transmits the packet on to the downstream servoamplifier SA2 by way of the buffer circuit 203, and also outputs the packet to the reception control circuit 202, after converting it into a parallel signal in the serial-parallel converter 201. When the reception control circuit 202 reads the header of the packet, as is shown in FIG. 4, it outputs the header detection signal (synchronizing signal) S3 to the timer circuit 206, and also outputs reception data for its own servoamplifier SA1 to the digital-analogue converter 204, where it is converted into analogue voltage and output to the servo motor M1. The address of the data in the packet is determined by its storage position (bit), and in this embodiment the data for the second servoamplifier SA2 is stored in the section of a set number of words following the header section, the data for the first servoamplifier is stored in the section of a set number of words following that. The servoamplifiers SA1, SA2 respectively read the corresponding locations in the packets as data for themselves.

As has already been pointed out, the delay time D1 from the generation of the signal S2 for starting transmission of the command voltage to the servoamplifiers until the data is serialised and the packet transmitted to the transmission line, the delay time D2 for synchronizing serial data on the reception side, and the delay time D3 until the completion of header reception is detected are already known at the stage of designing the circuitry configurations of the machines which make up this system. This means that their total (D1+D2+D3) is also known, as is the delay time D0 from the generation of the signal S1 for starting calculation of the command voltage (reference time t0) to that of the signal S2 for starting transmission of the command voltage to the servoamplifiers. The timing for reading position data on the servo motors SA1, SA2 has been determined in advance as a point when time T has elapsed from the reference time t0, so that the value T is also known. Thus, the above known delay time (D0+D1+D2+D3) against the elapsed time T of the timing for reading this known position data is programmed as correction value 1. The delay time Dp which is required for the signal to propagate on the transmission line is determined by the system, and becomes known only when the type (material) and length of the transmission line is determined. This propagation delay time Dp is therefore programmed as correction value 2 once the system is determined.

Correction value 1 and correction value 2 are added in the adder 205, and the resultant value [D0+D1+D2+D3+Dp] is determined. This value is programmed as the initial value of the timer circuit 206. The timer circuit 206 begins measuring once the header detection signal (synchronizing signal) S3 is received from the reception control circuit 202, and, when the time T is reached, outputs the latch and transmission timing signal S4 to the data latcher 210 and transmission control circuit 211. In other words, the time from reception of the header detection signal S3 to output of the latch and transmission timing signal S4 is T−[D0+D1+D2+D3+Dp].

Figure 6:
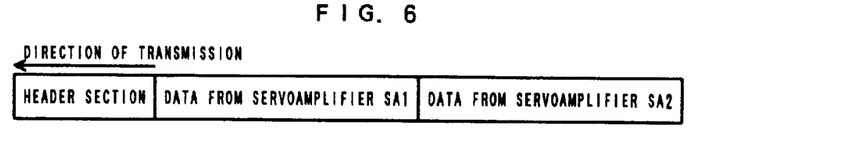
FIG. 6 is an explanatory drawing of the packet which is input from the servoamplifier illustrated in FIG. 3 to the CNC device illustrated in FIG. 1.

The pulse coder P1 generates pulses having a code which is generated whenever the servo motor M1 has rotated a fixed amount. The reversible counter 207 counts the pulses fed back from the pulse coder P1, and stores the position of the servo motor M1. When the latch and transmission timing signal S4 is input into the data latcher 210, the data latcher 210 latches the value of the reversible counter 207. The transmission control circuit 211 receives the latch and transmission timing signal S4 and, after adding a header section to the position data for the servo motor M1, which has been latched in the data latcher, transmits it together with the position data for the downstream servo motor M2, which has been sent from the downstream servoamplifier SA2 to be stored in the buffer circuit 209, to the parallel-serial converter 212, where the signal is converted into a serial one as shown in FIG. 6, and transmitted to the CNC device 10.

At the point in time when the reception control circuit 202 reads the header section and transmits the header detection signal (synchronizing signal) S3 to the timer circuit 206, there is already a delay of [D0+D1+D2+D3+Dp] in relation to the reference time t0. Since the timer circuit 206 measures the set value T−[D0+D1+D2 +D3+Dp] before outputting the latch and transmission timing signal S4 and latching the position of the servo motor, the time of this latching is delayed by a total of the abovementioned delay time and the time measured by the timer circuit. In other words, $$[D0+D1+D2+D3+Dp]+\{T-[D0+D1+D2+D3+Dp]\}=T$$

applies, and the position data for the servo motor is latched at a delay of the time T in relation to the pre-determined reference time t0.

The same action as is performed in the servoamplifier SA1 is also performed in downstream servoamplifiers, which is to say the servoamplifier SA2 in the case of the present embodiment, except that the delay time Dp which is programmed as correction value 2 differs. (The values of the delay times D2 and D3 may also differ according to the servoamplifier.)

The result, as illustrated in FIG. 4, is that the delay generated against each servoamplifier is corrected one by one, and each data latcher latches the position data for the respective servo motor with a timing which is delayed by the time T in relation to the reference time t0. This means that the positions of all the servo motors are detected at the same point in time, and the position data for each servo motor which is sent to the CNC device 10 is used to calculate the next command voltage.

The CNC device 10 synchronizes each shaft on the basis of the detected position of the servo motor of each shaft, thus controlling position and speed, and the accuracy of this control is reduced if the timing with which the position of the servo motor is detected differs. However, the present invention allows both position and speed to be detected with a high degree of accuracy, because the positions of the servo motors are detected at the same point in time, as has been explained above, and this position is used for controlling both position and speed.

The propagation delay time Dp of the signals may actually be measured for programming as correction value 2, but it is also possible to estimate it by calculations based on the specifications of the transmission line, and in particular its type (material) and length. It is easier to measure (specify) the type (material) and length of the transmission line than to measure the propagation delay time Dp.

Thus, formulae for calculating the propagation delay time by the type of transmission line with its length as a parameter, or tables in which propagation delay times for each type of transmission line are stored by length, are programmed into and stored in the non-volatile memory section of the CNC device. At the stage when a system becomes definitive and the type and length of the transmission line is determined, and before the power source is switched on and normal control begins, the type and length of the transmission line are input and the correction value established. In this manner, the correction value 2 for each shaft is determined from the abovementioned formulae or tables and programmed automatically into the registers of the corresponding servoamplifiers.

In the first embodiment as described above, the propagation delay time Dp is either measured directly and programmed in as correction value 2, or programmed automatically in advance by setting the type (material) and length of the transmission line.

Figure 7:
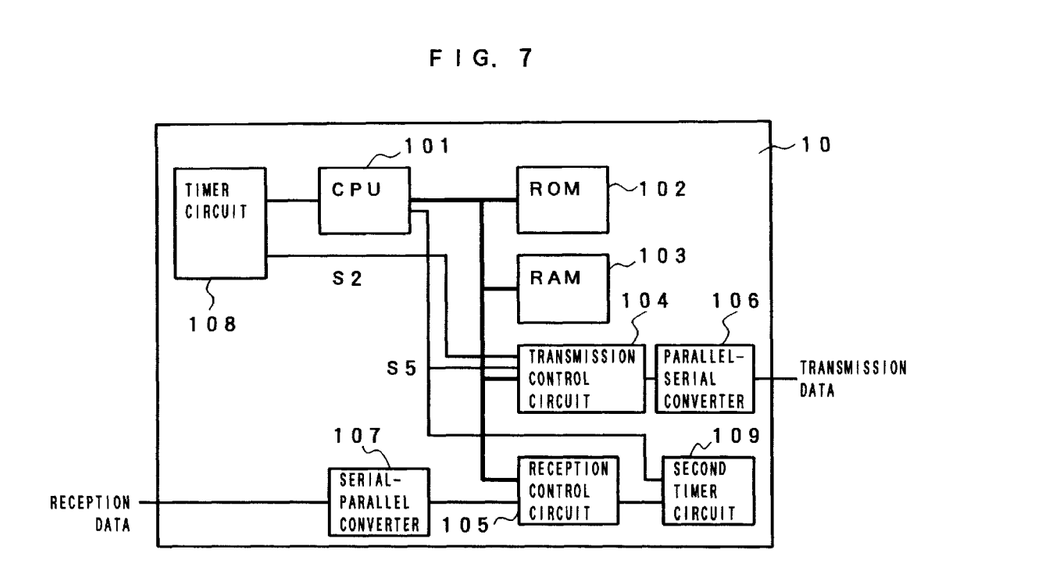
FIG. 7 is a block diagram of the principal section of the CNC employed in the second embodiment of the method to which the present invention pertains.
Figure 8:
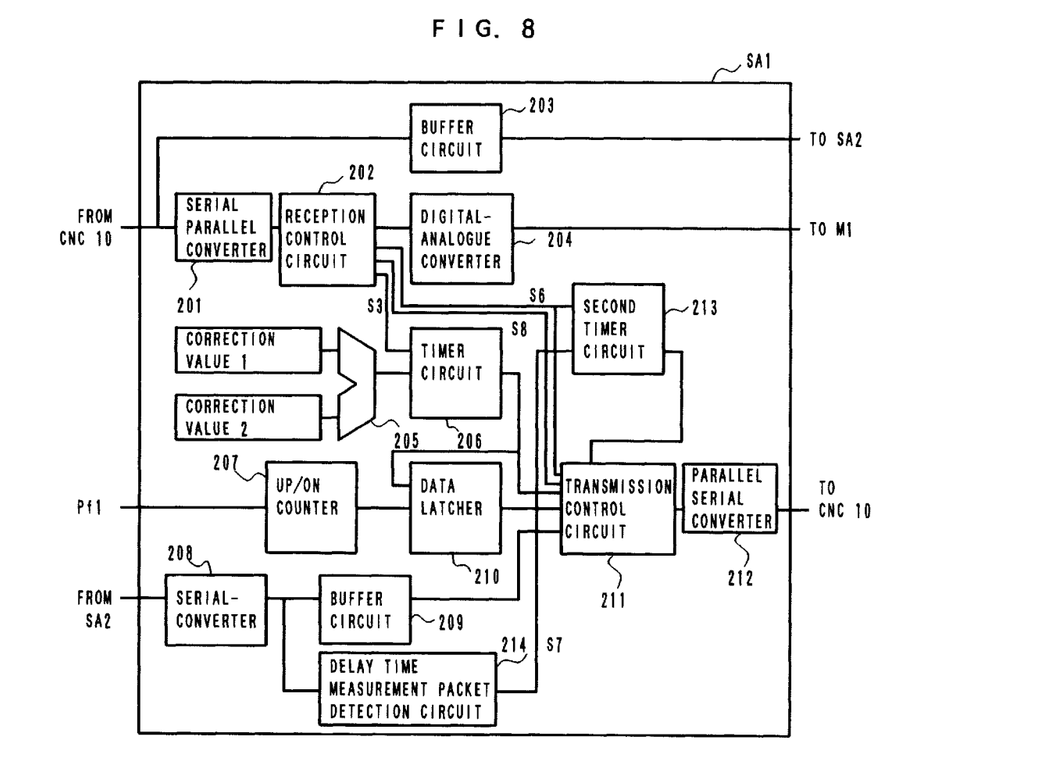
FIG. 8 is a block diagram of the principal section of the servoamplifier employed in the second embodiment of the method to which the present invention pertains.
Figure 9:
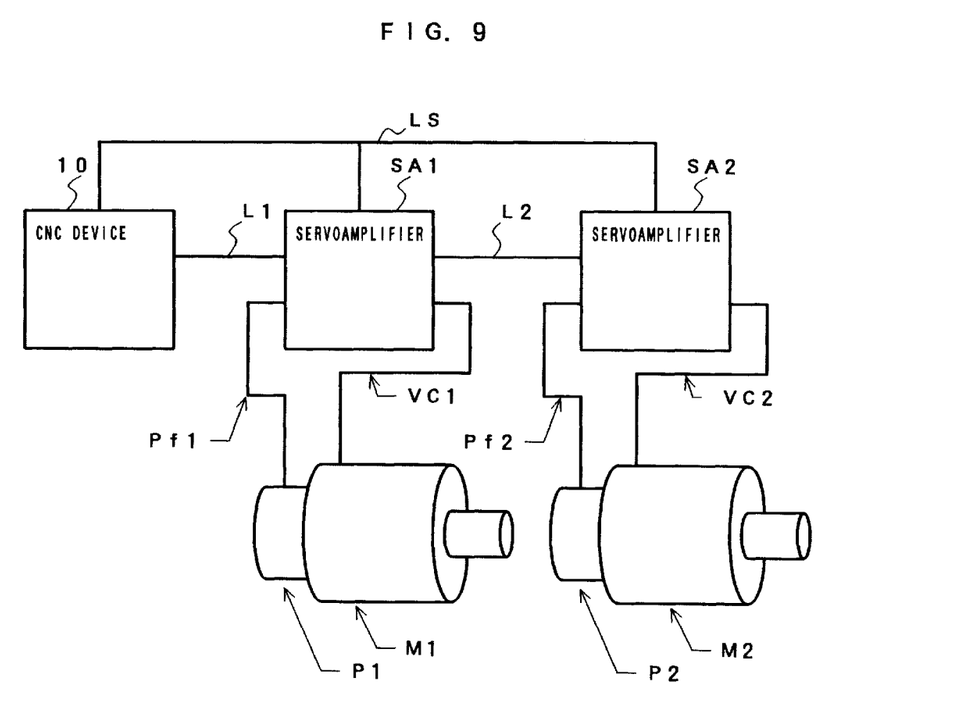
FIG. 9 is a block diagram of the servo system employed in the third embodiment of the method to which the present invention pertains.

FIGS. 7 and 8 will now be used in order to describe a second embodiment, which differs from the first.

The characteristic of this second embodiment, as will be explained in detail below, is that the system itself both measures the propagation delay time and sets it as the correction value 2 automatically.

The CNC device in this second embodiment will first be described using the block diagram of its principal section in FIG. 7.

This differs from the first embodiment only in that it has a second timer circuit 109, which is connected to the reception control circuit 105, while a delay time measurement packet transmission signal S5 is input from the processor 101. Those parts of the configuration which are the same as those shown in FIG. 2 are denoted with the same reference numerals.

The servoamplifier SA1 used in the second embodiment will be explained with reference to the block diagram in FIG. 8.

The difference in structure between the servoamplifier SA1 illustrated in FIG. 8 and that illustrated in FIG. 3 is that the former has an additional second timer circuit 213 and a delay time measurement packet detection circuit 214. The input side of the delay time measurement packet detection circuit 214 is connected to the serial-parallel converter 208 which receives data from the downstream servoamplifier SA2, while its output side is connected to the second timer circuit 213, to which it outputs a delay time measurement packet detection signal S7 from the downstream servoamplifier. The second timer circuit 213 is connected in such a manner as to receive a delay time measurement packet reception signal S6 from the reception control circuit 202, while this delay time measurement packet reception signal S6 is also input into the transmission control circuit 211. The output of the second timer circuit 213 is fed to the transmission control circuit 211. The above are the differences. That parts of the configuration which are the same as those shown in FIG. 3 are denoted by the same reference numerals.

There follows an explanation of the action whereby the propagation delay time Dp is measured automatically in this second embodiment.

Before normal communication commences, a delay time measurement command is input, and the processor 101 of the CNC device 10 outputs the delay time measurement packet transmission signal S5 to the transmission control circuit 104 and the second timer circuit 109. When the second timer circuit 109 receives this signal, it begins measuring. Meanwhile, the transmission control circuit 104, on receiving this signal, outputs the delay time measurement packet to the transmission line L1 by way of the parallel-serial converter 106. The delay time measurement packet and the normal data packet are distinguished by the header data.

The upstream servoamplifier SA1, having received the delay time measurement packet, transmits it on by way of the buffer circuit 203 to the downstream servoamplifier. This process is repeated down to the servoamplifier furthest downstream. Each servoamplifier receives the header section of the delay time measurement packet by way of the serial-parallel converter 201 into the reception control circuit 202. The reception control circuit 202 outputs the delay time measurement packet reception signal S6 to the second timer circuit 213 and transmission control circuit 211. Upon receiving this signal S6, the second timer circuit 213 begins measuring, while the transmission control circuit 211 sends a reply delay time measurement packet by way of the parallel-serial converter 212 to the transmission line and thus to the CNC device 10 or the upstream servoamplifier.

When the reception control circuit 105 detects the header of the delay time measurement packet by way of the serial-parallel converter 107, the CNC device 10 outputs a signal to the second timer circuit 109 in order to halt its measurement. The count value of the second timer circuit 109 is the total of the known delay times resulting from the serialisation and synchronization of the above data [D1+D2+D3] and the propagation time Dp generated in both directions on the transmission line (L1 in FIG. 1) between the CNC device 10 and the servoamplifier furthest upstream. The propagation delay time Dp can be determined by calculation from the count value of the second timer circuit 109 and the known delay time [D1+D2+D3]. The propagation delay time Dp determined in this manner is sent to the servoamplifier SA1 furthest upstream from the CNC device and programmed in as correction value 2.

The delay time measurement packet detection circuit 214 of each servoamplifier, having received from the servoamplifier next downstream from itself the header section of the reply delay time measurement packet by way of the serial-parallel converter 208, transmits the delay time measurement packet reception signal S7 to the second timer circuit 213 in order to halt its measurement. The reply delay time measurement packet received from the downstream servoamplifier is not passed on to the upstream servoamplifier, but discarded. As a result, the value which is stored in the second timer circuit 213 of each servoamplifier represents the time from the generation of the delay time measurement packet reception signal S6 from the reception control circuit 202 in the servoamplifier in question to the generation of the delay time measurement packet reception signal S7 from the delay time measurement packet detection circuit 214 after reception of the header section of the reply delay time measurement packet from the servoamplifier next downstream.

Next, the CNC device 10 transmits a packet to each servoamplifier commanding it to transmit the measurement value in its second timer circuit 213. Upon receiving this packet, the reception control circuits 202 of the servoamplifiers send a transmission command S8 to the transmission control circuit 211, and the value in the second timer circuit 213 is transmitted to the CNC device 10.

Let it be assumed here that a plurality of servoamplifiers SA1, SA2 . . . SAn is connected to the CNC device 10 in the manner of a daisy-chain. If so, the measurement values in the second timer circuits 213 of the servoamplifiers will be as follows.

Let t1 be the time at which the delay time measurement packet from the device next upstream from the first servoamplifier SAi (servoamplifier i–1, or the CNC device 10 if i=1) has been received by amplifier SA; (this being the time at which it is input into the serial-parallel converter 201 and buffer circuit 203). Let t2 be the time from t1 to the halting of the measurement by the second time circuit 213, the delay time measurement packet having been transmitted from the servoamplifier SAi to the servoamplifier SAi+1 next downstream, the servoamplifier SAi+1 next downstream having received this signal and transmitted the reply delay time measurement packet, and the servoamplifier SAi having received it. Furthermore, let t3 be the time from t1 to the commencement of measurement by the second timer circuit 213, the servoamplifier SAi having detected reception of the delay time measurement packet from the machine next upstream. In this case, the measurement value of the second timer circuit 213 is [t2–t3]. In other words, t2 is the sum of the processing time in the buffer circuit 203 of the servoamplifier SAi, the propagation delay time on the transmission line from the servoamplifier SAi to the servoamplifier SAi+1 next downstream, the delay time from the header section of the delay time measurement packet being input into the serial-parallel converter 201 in the servoamplifier SAi+1 next downstream to the delay time measurement packet reception signal S6 being output from the reception control circuit 202 (i.e., processing time of the S/P converter 201 and reception control circuit 202), the processing time in the transmission control circuit 211 and parallel-serial converter 212, the propagation delay time between the servoamplifier SAi+1 next downstream and the servoamplifier SAi, the processing time in the serial-parallel converter 208 of the servoamplifier SAi, and the processing time in the delay time measurement packet detection circuit. Moreover, t3 is the total of the processing time in the serial-parallel converter 201 and reception control circuit 202 of the servoamplifier SAi.

Of these, all the values with the exception of the propagation time on the transmission line are known, having been clarified at the time when the circuitry configuration was designed. It is therefore possible to determine the propagation delay time on the transmission line between the servoamplifiers from the measured values of each of the second timer circuits and these known values. For the servoamplifier SA2 next downstream from the servoamplifier SA1 furthest upstream, correction value 2 is set, by the CNC device 10, as being the sum of the propagation delay time resulting from the transmission line between the CNC device and the servoamplifier SA1 furthest upstream (the value previously determined as correction value 2 for the most upstream servoamplifier) and the propagation delay time resulting from the transmission line between the servoamplifier SA1 furthest upstream and the servoamplifier SA2 next downstream. For the servoamplifier SA3 next-but-one downstream from the servoamplifier SA1 furthest upstream, a value obtained by adding to the value, being determined as the correction value 2 for the servoamplifier SA2 next downstream from the servoamplifier SA1 furthest upstream, the propagation delay time, resulting from the transmission line between the servoamplifier SA2 next downstream and the servoamplifier SA3 next-but-one downstream, may be programmed as correction value 2. This correction value 2 is programmed in the same way against successive servoamplifiers.

In this manner it is possible for the propagation delay time Dp to be measured and corrected automatically even where a plurality of servoamplifiers is connected in the manner of a daisy-chain. If the servoamplifiers are connected not in the manner of a daisy-chain but each by means of its respective transmission line to the CNC device, there is no need for a buffer circuit 203, serial-parallel converter 208, buffer circuit 209, delay time measurement packet detection circuit 214 or second timer circuit 213 in each servoamplifier. Instead, the delay time measurement packet can be transmitted to each servoamplifier, the length of time until detection of the header of the reply delay time measurement packet is measured, and the propagation delay time between the CNC device and each servoamplifier is determined. In other words, it may be determined by the method whereby the propagation delay time to the servoamplifier furthest upstream was determined above.

The first and second embodiments have shown examples where the header section is used as the synchronizing signal, making use of the data transmission line. However, it is also possible to have a synchronizing signal line which is separate from the data transmission line.

There follows, with reference to FIGS. 9–12, a description of a third embodiment wherein the present invention is applied to a CNC device.

In the third embodiment, the synchronizing signal is transmitted using a signal line which is separate from the signal line used for transmitting data. It will be clear from a comparison between FIG. 9, which illustrates the third embodiment, and FIG. 1, which illustrates the first embodiment, that in the third embodiment the CNC device and the servoamplifiers SA1, SA2 are connected by a synchronizing signal line LS.

Figure 10:
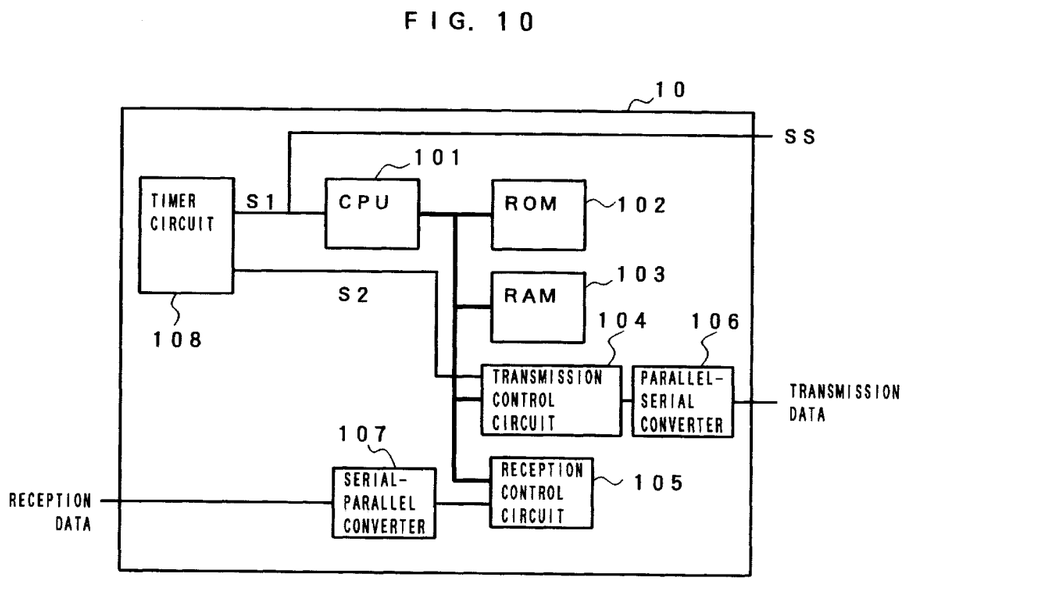
FIG. 10 is a block diagram of the principal section of the CNC device in the servo system illustrated in FIG. 9.
Figure 11:
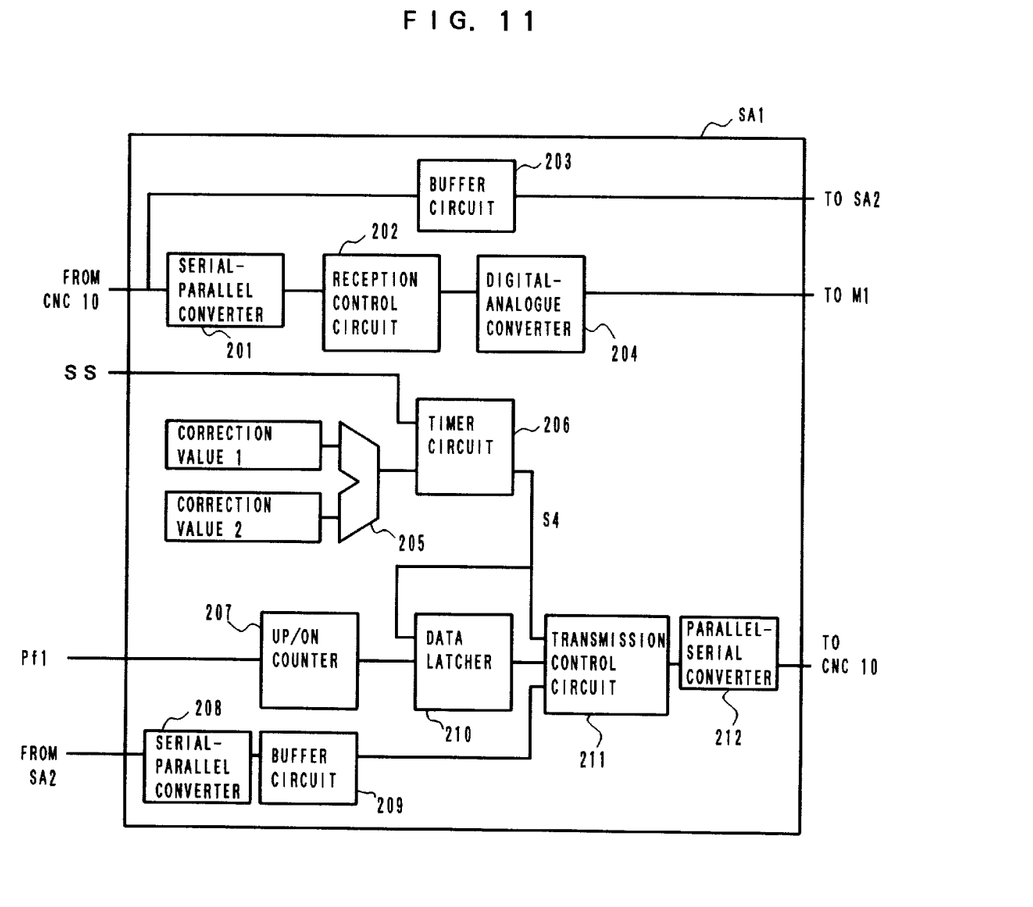
FIG. 11 is a block diagram of the principal section of the servoamplifier in the servo system illustrated in FIG. 9.

Furthermore, as is shown in FIG. 10 and will be clear from a comparison with FIG. 2 which illustrates the CNC device to which the first embodiment is applied, the CNC device to which the third embodiment is applied is characterised by the fact that the signal S1 for starting calculation of the command voltage is output from the timer circuit 108 as the synchronizing signal SS. Moreover, as will be seen from FIG. 3, in the servoamplifier SA1, to which the first embodiment is applied, the header detection signal (synchronizing signal) S3 from the reception control circuit 202 is input into the timer circuit 206. However, as FIG. 11 shows, in the servoamplifier SA1, to which the third embodiment is applied, the synchronizing signal SS is input from the CNC device. That part of the configuration which is the same in FIGS. 9–11 as that shown in FIGS. 1–3 has been allocated the same reference numerals.

Here, the action when the third embodiment is implemented will be described using the timing chart in FIG. 12.

The signal S1 for calculation of the command voltage to begin is output from the timer circuit 108 of the CNC device 10 with a predetermined cycle. The processor 101 receives this signal and begins calculating the command voltage. The signal S2 for starting transmission of the command voltage is generated with the same predetermined cycle from the timer circuit 108 but delayed in relation to the signal S1 for starting calculation of the command voltage. This causes the command voltage packet to be transmitted by way of the transmission control circuit 104 and parallel-serial converter 106 to the servoamplifiers SA1, SA2, in the same manner as is shown with respect to the first embodiment in FIGS. 1–3.

In this third embodiment, the signal S1 for starting calculation of the command voltage is transmitted to the servoamplifiers SA1, SA2 as the synchronizing signal SS, not by way of the data transmission line L1 but by means of a separate synchronizing signal line LS.

The servoamplifiers SA1, SA2 receive this synchronizing signal SS, causing the timer circuit 206 to start up. Into this timer circuit 206 has been programmed in advance a correction value obtained by adding correction value 1 and correction value 2 in the adder 205. When each timer circuit 206 reaches the fixed time T, the latch and transmission signal S4 is output to the data latcher 210 and transmission control circuit 211. This signal allows the positions of the servo motors M1, M2 to be transmitted from the parallel-serial converter 212 to the CNC device 10. As in the first embodiment illustrated in FIGS. 1–3, in this third embodiment too, it is necessary to detect the positions of the servo motors M1, M2 at a point in time after the passage of the time T from when the signal S1 for starting calculation of the command voltage was generated (t0).

A delay of several clock pulses is generated in the synchronizing signal SS when it is converted within the servoamplifiers into a signal synchronized with the internal clock. This delay is already a known factor at the design stage, and the corresponding correction value is therefore programmed as correction value 1, while the propagation delay time between the CNC device and each of the servoamplifiers is programmed as correction value 2. As a result, (correction value 1+correction value 2) is programmed into each timer circuit 206 as the initial value.

Figure 12:
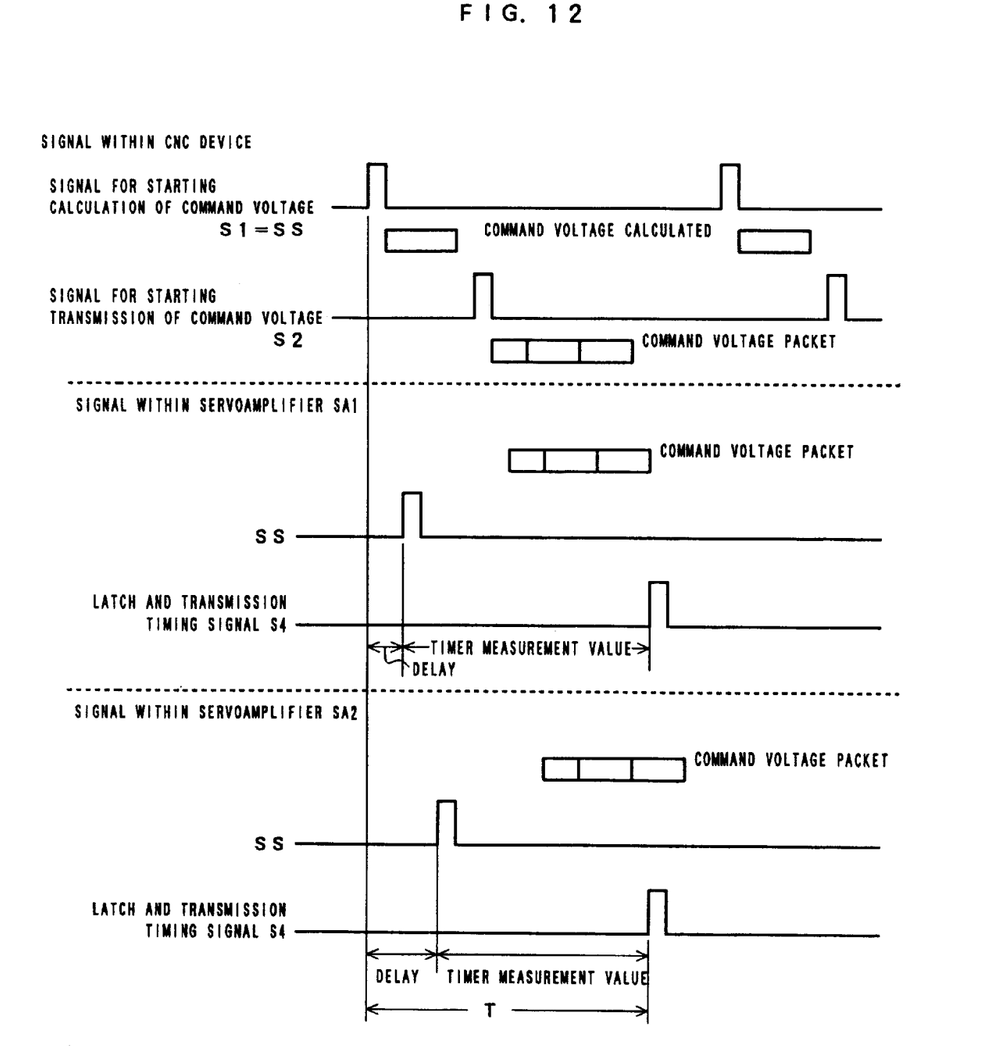
FIG. 12 is a timing chart when the third embodiment is implemented with the servo system illustrated in FIG. 9.

As FIG. 12 shows, the synchronizing signal SS is delayed in each of the servoamplifiers SA1, SA2 in relation to the signal S1 for starting calculation of the command voltage by an amount of time which corresponds to the correction values 1 and 2. Moreover, the synchronizing signal SS2 which is received by the servoamplifier SA2 is delayed by an amount corresponding to the greater length of the transmission line from the CNC device 10 in relation to the synchronizing signal SS1 which is received by the servoamplifier SA2. Since this delay is also corrected by correction value 2, the value of the reversible counter 210 (positions of the servo motors M1, M2) is latched and transmitted at the same time in servoamplifiers SA1, SA2.

The values which are programmed as the above correction values 2 can be determined by simple measurement because the CNC device 10 and the servoamplifiers SA1, SA2 are connected by a single synchronizing signal line. Moreover, provided that the type (material) and length of this signal line are known, it can also be determined by means of a simple calculation. As has already been stated, the propagation delay times corresponding to different types (materials) and lengths of transmission line can be input in advance into the CNC device as a formula or table in which they are stored so that it can then be determined by inputting the type (material) and length of the actual transmission line. In this embodiment, as will be clear from what has gone before, the same method can be applied irrespective of whether the method of communication is in the manner of a daisy-chain or the CNC device and each of the servoamplifiers are connected directly.

In each of the above embodiments, correction values 1 and 2 have been added in the adder 205 and programmed as the correction value into the timer circuit 206, but when determining correction value 2 it is also possible to do so in consideration of correction value 1 and program this value into each of the servoamplifiers. In this case there is no need for the adder 205. If the configuration is not in the manner of daisy-wheel, and the CNC device and the servoamplifiers are connected by separate transmission lines, the above correction value can be set on the CNC side and taken into consideration when transmitting the synchronizing signal from the CNC device 10 to each of the servoamplifiers.

Moreover, each of the above embodiments has been described using an example where the present invention is applied to a servo system with a CNC device, but it can also be applied to systems where a plurality of machines are connected by communication, including ones which are in the relationship of master and slave, and it is necessary to synchronize the action between the machines.

We claim:

1. A method of synchronization in communication, wherein a plurality of machines which are connected by means of serial communication and operating in synchronization, comprising the steps of:

programing the propagation delay time required for a synchronizing signal to propagate from the transmission side to the reception side into the machine on the transmission or reception side as a correction value; and synchronizing said machines by correcting said synchronizing signal by means of said correction value.

2. The method of synchronization in communication according to claim 1, wherein both data and the synchronizing signal are transmitted on the same transmission line.

3. The method of synchronization in communication according to claim 1, wherein said synchronizing signal is transmitted on a different transmission line from the data transmission line.

4. The method of synchronization in communication according to claim 1, wherein one of said plurality of machines is programmed with a formula for determining the propagation delay time having the type and length of the transmission line as parameters, or a table in which the type and length of the transmission line are stored as parameters, the propagation delay time resulting from the transmission line being determined by inputting the type and length of the transmission line into said machine, while said correction value is determined from said propagation delay time and programmed into each of the machines.

5. The method of synchronization in communication according to claim 1, wherein a specific signal is transmitted from the transmission side, and said specific signal, being received on the reception side, is immediately sent back to the transmission side, the time from said specific signal's being transmitted to its being received back being measured on the transmission side, the propagation delay time being determined from this measured value and programmed into each of the machines as the correction value.

6. The method of synchronization in communication according to claim 1, wherein the delay time in the machine elements on the transmission line which is required for the synchronizing signal to propagate is programmed beforehand into the machine on said transmission or reception side, and at the stage when said plurality of machines is connected by the transmission line, the delay time resulting from the transmission line is programmed into the machine on said transmission or reception side, the correction value being determined from these two delay times to correct both the synchronizing signal, and the propagation delay time, thus synchronizing said plurality of machines.

7. The method of synchronization in communication according to claim 1, wherein said plurality of machines is connected in the manner of a daisy-chain.

8. A synchronization control system which comprises a first machine which is the master and a second machine which is connected to the first machine as a slave; wherein
   said first machine has
      a transmission means for transmitting a specific signal to the second machine;
      a reception means for receiving from the second machine an answer signal to the effect that the second machine has received the specific signal; and
      a first timer which begins measuring when said means of transmission transmits said specific signal, and finishes measuring when said means of reception receives from the second machine the answer signal to the effect that it has received said specific signal,
   wherein said second machine has
      means for transmitting back an answer signal to the first machine as soon as it receives said specific signal from the first machine, and
      a second timer for the purpose of adjusting the time from the request for transmission from the first machine until sampling of the signal to the first machine in response to the request,
   further said synchronization control system has
      means for calculating propagation delay time, whereby the propagation delay time between said first machine and said second machine is calculated from the measured time of said first timer; and
      means for programming the value calculated by said calculating propagation delay time calculating means as one correction value of the second timer of the second machine.

9. A serial communication system between a numerical control device and servoamplifiers which comprises one numerical control device and a plurality of servoamplifiers connected in the manner of a daisy-chain to that numerical control device, said numerical control device sending a synchronizing signal to each of the servoamplifiers by way of a transmission line in order to implement synchronized control with the servoamplifiers, wherein:
   said servoamplifiers have
      a reception control circuit which receives signals sent from said numerical control device,
      a timer which begins measuring when said reception control device receives a signal from said numerical control device, and
      a transmission control circuit which sends feedback data from pulse coders attached to the servo motor and servo motors downstream from it when the timer has finished measuring,
   further said timers
      connect a means whereby a value obtained by subtracting the time required for the signal to propagate on the transmission line from the time required from the output of the signal for starting calculation of the command voltage within said numerical control device until the reception of the signal by the timer from said reception control circuit is set as a first correction value, and a means whereby the time required for the signal to propagate on the transmission line is set as a second correction value, and,
      finish measuring concluding when the amount of time obtained by subtracting the total of said first and second correction values from the time which has elapsed from a point in time which is pre-determined as the point at which feedback data from the pulse coder linked to the servo motor is read, and the signal for starting calculation of the command voltage was output within said numerical control device.

10. A serial communication system between a numerical control device and servoamplifiers which comprises one numerical control device and a plurality of servoamplifiers connected in the manner of a daisy-chain to that numerical control device, said numerical control device sending a synchronizing signal to each of the servoamplifiers by way of a transmission line in order to implement synchronized control with the servoamplifiers, wherein
   said numerical control device includes
      a reception control circuit for the purpose of receiving output signals from the servoamplifier furthest upstream,
      a transmission control circuit for the purpose of transmitting the delay time measurement packet,
      a first timer which begins measurement with the transmission of said delay time measurement packet, and finishes measurement when said reception control circuit receives the delay time measurement packet sent back from the servoamplifier furthest upstream,
      a first delay time calculating means whereby the propagation delay time on the transmission line between this numerical control device and the servoamplifier furthest upstream is calculated on the basis of the value measured by said first timer; and
      means for setting the propagation delay time calculated by said first delay time calculating means as a correction value into the servoamplifier furthest upstream,
   wherein, each of said plurality of servoamplifiers includes
      a reception control circuit for the purpose of receiving the header of the delay time measurement packet by way of the transmission line from said numerical control device where it is the servoamplifier furthest upstream, or otherwise from the servoamplifier next upstream,
      a delay time measurement packet detection circuit which detects the header of the delay time measurement packet sent back from the servoamplifier next downstream,
      a second timer which begins measurement when said reception control circuit receives the header of the delay time measurement packet, and finishes measurement when said delay time measurement packet detection circuit detects the header of the delay time measurement packet which has been sent back,
      a second delay time calculating means whereby the propagation delay time on the transmission line between this servoamplifier and the servoamplifier next downstream is calculated on the basis of the value measured by said second timer, and,
      means for setting the propagation delay time calculated by said second delay time calculating means as a correction value into the servoamplifier next downstream.

* * * * *

UNITED STATES PATENT AND TRADEMARK OFFICE
CERTIFICATE OF CORRECTION

PATENT NO.: 5,990,638
DATED : November 23, 1999
INVENTOR(S): Kazunari AOYAMA, et al.

It is certified that error appears in the above-identified patent and that said Letters Patent is hereby corrected as shown below:

Col. 5, line 22, "Si" should be --S1--.

Col. 11, lines 44-45, there should not be a new paragraph after line 44. Line 45 should not start a new paragraph.

Signed and Sealed this

Sixteenth Day of May, 2000

Q. TODD DICKINSON

*Attest:*

*Attesting Officer*         Director of Patents and Trademarks